US012670925B2

(12) United States Patent
McCabe et al.

(10) Patent No.: US 12,670,925 B2
(45) Date of Patent: Jun. 30, 2026

(54) METHOD AND APPARATUS TO CLASSIFYING CRAFT

(71) Applicant: BAE SYSTEMS plc, London (GB)

(72) Inventors: Faye Emily McCabe, Birmingham (GB); Chris Baber, Birmingham (GB)

(73) Assignee: BAE SYSTEMS PLC, London (GB)

( * ) Notice: Subject to any disclaimer, the term of this patent is extended or adjusted under 35 U.S.C. 154(b) by 276 days.

(21) Appl. No.: 18/562,488

(22) PCT Filed: May 26, 2022

(86) PCT No.: PCT/GB2022/051334
§ 371 (c)(1),
(2) Date: Nov. 20, 2023

(87) PCT Pub. No.: WO2022/248861
PCT Pub. Date: Dec. 1, 2022

(65) Prior Publication Data

US 2024/0282331 A1 Aug. 22, 2024

(30) Foreign Application Priority Data

May 28, 2021 (EP) .................................... 21275066
May 28, 2021 (GB) .................................... 2107666

(51) Int. Cl.
*G10L 25/30* (2013.01)
*G10L 25/51* (2013.01)

(52) U.S. Cl.
CPC .............. *G10L 25/51* (2013.01); *G10L 25/30* (2013.01)

(58) Field of Classification Search
CPC ................................ G10L 25/51; G10L 25/30
See application file for complete search history.

(56) References Cited

U.S. PATENT DOCUMENTS

2015/0219762 A1* 8/2015 Meerpohl ............... G01S 15/74
367/131

FOREIGN PATENT DOCUMENTS

| | | |
|---|---|---|
| CN | 105488466 A | 4/2016 |
| CN | 106529428 A | 3/2017 |
| CN | 107609488 A | 1/2018 |

(Continued)

OTHER PUBLICATIONS

International Search Report and Written Opinion received for PCT/GB2022/051334. Mailed: Aug. 29, 2022. 10 pages.

(Continued)

*Primary Examiner* — Abdallah Abulaban
(74) *Attorney, Agent, or Firm* — Arcane Law PLLC

(57) ABSTRACT

A method of training a machine learning, ML, algorithm, is described. The method is implemented, at least in part, by a computer comprising a processor and a memory. The method comprises: providing training data comprising a set of audio signals, including a first audio signal, as respective bitstreams, corresponding with respective sets of watercraft (S501); training the ML algorithm using the provided training data comprising detecting the respective sets of watercraft and classifying the detected respective sets of watercraft according to a set of classes, including a first class, based, at least in part, on a set of labels, including a first label, wherein the set of labels relates to propeller, propulsor, prime mover and/or submerged equipment associated with watercraft (S502).

20 Claims, 6 Drawing Sheets

(56) References Cited

FOREIGN PATENT DOCUMENTS

| | | | | | |
|---|---|---|---|---|---|
| CN | 108694346 | A | | 10/2018 | |
| CN | 110807365 | A | * | 2/2020 | ............... G06N 3/08 |
| CN | 111709299 | A | * | 9/2020 | ........... G06F 18/214 |
| CN | 112307926 | A | | 2/2021 | |
| CN | 112786072 | A | | 5/2021 | |
| WO | 2022248861 | A1 | | 12/2022 | |

OTHER PUBLICATIONS

GB Search Report under Section 17(5) received for GB Application No. 2107666.6 dated Nov. 16, 2021. 7 pages.

Extended European Search Report received for EP Application No. 21275066.5 dated Nov. 11, 2021. 8 pages.

* cited by examiner

| | Element Number | | | | | | |
|---|---|---|---|---|---|---|---|
| Construct | 1 | 2 | 3 | 4 | 5 | Contrast | Fla |
| Diesel | 1 | 1 | 0 | 1 | 1 | Quiet | 3 |
| In-out | 1 | 1 | 0 | 0 | 0 | Consistent | 5 |
| Blade flutter | 1 | 1 | 1 | 1 | 0 | Blade slap | 3 |
| Whine | 1 | 0 | 0 | 1 | 0 | Hum | 3 |
| Engine | 1 | 0 | 0 | 1 | 1 | Muffled | 2 |
| Diesel Engine | 1 | 1 | 1 | 0 | 1 | Steam generator | 3 |
| Flutter | 1 | 1 | 0 | 1 | 1 | Compressed cavitation | 3 |
| Cavitation | 0 | 1 | 1 | 0 | 0 | Shaft | 3 |
| In-out | 1 | 1 | 0 | 1 | 0 | Consistent | 4 |
| Blade flutter | 1 | 1 | 1 | 1 | 0 | Blade slap | 3 |
| **Total** | 9 | 8 | 4 | 7 | 4 | | |
| **Template** | **1** | **1** | **0** | **0** | **0** | | |

Fig. 1

| | Element Number | | | | | | |
|---|---|---|---|---|---|---|---|
| Construct | 1 | 2 | 3 | 4 | 5 | Contrast | Fla |
| Diesel | 1 | 1 | 0 | 1 | 1 | Quiet | 4 |
| Blade flutter | 1 | 1 | 1 | 1 | 0 | Blade slap | 4 |
| Whine | 1 | 0 | 0 | 1 | 0 | Hum | 4 |
| Engine | 1 | 0 | 0 | 1 | 1 | Muffled | 3 |
| Diesel Engine | 1 | 1 | 1 | 0 | 1 | Steam generator | 2 |
| Flutter | 1 | 1 | 0 | 1 | 1 | Compressed cavitation | 4 |
| Cavitation | 0 | 1 | 1 | 0 | 0 | Shaft | 2 |
| Blade flutter | 1 | 1 | 1 | 1 | 0 | Blade slap | 4 |
| **Total** | 7 | 6 | 4 | 6 | 4 | | |
| **Template** | **1** | **1** | **0** | **1** | **0** | | |

Fig. 2

| | | |
|---|---|---|
| Motion | Signature | Clarity |
| Mechanism | Engine Configuration | Speed |
| Engine Movement | Propeller | Pattern |

Fig. 3

| | | |
|---|---|---|
| Motion | Signature | Clarity |
| Mechanism | Engine Configuration | Speed |
| Engine Movement | Propeller | Pattern |

Fig. 4E

METHOD AND APPARATUS TO CLASSIFYING CRAFT

FIELD

The present invention relates to classifying watercraft.

BACKGROUND TO THE INVENTION

Watercraft, such as sea craft, typically use sensor systems including SONAR (SOund NAvigation and Ranging) (also known as sonar) for localizing and tracking contacts. Briefly, passive SONAR includes listening for (i.e. sensing) sounds emitted by contacts and propagated through the water, such as other watercraft and/or marine life. Briefly, active SONAR includes emitting pulses of sound and listening for reflections (i.e. echoes) from such contacts, propagated through the water. Knowing the speed of the sound in water and the time taken between emitting the pulses of sound and detecting the reflections, the acoustic locations of the contacts may be calculated. In this way, SONAR may be used for sensing contacts and acoustic location and tracking of contacts under water, together with measurement of echo characteristics of the contacts.

Sonar analysis is a highly refined skill, requiring analysts (also known as sonar operators or users) to classify and monitor objects (i.e. contacts), for example watercraft, in their environment through the detailed interpretation of hydrophone recordings and visual frequency analysis, for example of the hydrophone recordings. Errors in classification contribute to collisions and near misses, resulting in loss of life and/or injury to personnel and/or sinking and/or damage to watercraft. This is particularly relevant for analysts aboard submerged watercraft, such as submarines and/or submersibles, typically reliant on only hydrophone recordings c.f. visual observation from surface watercraft Hence, there is a need to improve detection, identification, classification and/or monitoring of contacts, for example watercraft.

SUMMARY OF THE INVENTION

A first aspect provides a method of training a machine learning, ML, algorithm, the method implemented, at least in part, by a computer comprising a processor and a memory, the method comprising:

providing training data comprising a set of audio signals, including a first audio signal, as respective bitstreams, corresponding with respective sets of watercraft;

training the ML algorithm using the provided training data comprising detecting the respective sets of watercraft and classifying the detected respective sets of watercraft according to a set of classes, including a first class, based, at least in part, on a set of labels, including a first label, wherein the set of labels relates to propeller, propulsor, prime mover and/or submerged equipment associated with watercraft.

A second aspect provides a method of classifying watercraft, the method implemented, at least in part, by a computer comprising a processor and a memory, the method comprising:

obtaining a first audio signal corresponding with a first set of watercraft, including the first watercraft, for example using a hydrophone; and inferring a first class of a set of classes, representing the first watercraft, using a trained ML algorithm and the obtained first audio signal, for example wherein the ML algorithm is trained according to the first aspect.

A third aspect provides a computer comprising a processor and a memory configured to implement a method according to the first aspect and/or the second aspect.

A fourth aspect provides a computer program comprising instructions which, when executed by a computer comprising a processor and a memory, cause the computer to perform a method according to the first aspect and/or the second aspect.

A fifth aspect provides a non-transient computer-readable storage medium comprising instructions which, when executed by a computer comprising a processor and a memory, cause the computer to perform a method according to the first aspect and/or the second aspect.

DETAILED DESCRIPTION OF THE INVENTION

According to the present invention there is provided a method of training a ML algorithm, as set forth in the appended claims. Also provided is a method of classifying watercraft, a computer, a computer program and a non-transient computer-readable storage medium. Other features of the invention will be apparent from the dependent claims, and the description that follows.

The present invention relates to Artificial Intelligence (AI) systems, preferably autonomous AI systems (also known as AI agent or autonomous agent), to support sonar analysis for watercraft. The introduction of AI systems can cause changes in work and team structure, creating additional supervisory tasks, potentially reducing Situation Awareness (SA) and attention and requiring a change in skills and. Appropriate trust in autonomy is needed to ensure the systems are used appropriately, requiring a user to have a good understanding of the processes, performance and purpose behind a system. Therefore, AI systems should be able to explain the reasoning behind their decision-making in a way that a human agent (e.g. sonar operator) would be able to follow or understand—a "narrative" behind the decision-making process, allowing them to assess whether these solutions are viable and sensical. To be able to explain that decision-making, common ground must be established between the human and the autonomous agent, providing a space where they can share and present information that can be understood by both parties. Therefore, by understanding how information is used in the classification process, it is possible to establish how autonomous systems should present their output in order to maximise trust in the information provided and minimise information ambiguity and uncertainty. Hence, it is desirable to provide consistency with the cognitive constructs professional audio analysts use to make sense of hydrophone recordings, for example. In this way, an understanding of decision-making strategies used for contact classification, and how this task is performed, may be obtained, for example from Royal Navy Sonar Operators compared with participants with experience of sound analysis but not of submarines (i.e., sound engineers).

The task of vessel classification using broadband sonar analysis typically relies on Sonar Operators (SOs) analysing hydrophone recordings to identify distinguishing features and define a contact solution containing type, bearing, speed and range information. When operating below periscope depth, a submarine crew must rely on information gathered from multi-sensor systems in order to gain Situation Awareness (SA) and build an accurate picture of their operational environment; no external views or data transfer from onshore is available. Very little has changed in terms of user interface for broadband analysis since the 1980s, suggesting scope to improve or augment these displays in order to improve classification decisions. Errors in classification contribute to collisions and near misses between Royal Navy (RN) submarines and commercial vessels.

The aural markers used in classification are subtle and require iterative analysis and thorough investigation. The variations within the sound are not easily identifiable without experience, and even with experience they can be difficult to distinguish. Analysts must work in high-pressure environments under severe time constraints and the features they are listening for can be ambiguous, and easily masked by environmental noise.

The process of classifying contacts involves abductive reasoning, with analysts observing "effects" in their environment to establish a most likely "cause". Analysts build a mental model of what they are listening to, identifying the characteristics of its engine, and then building on this understanding by inferring the speed the parts are moving at and the speed of the vessel, and then using the speed and engine characteristics to identify a specific classification. The Sonar Trainer highlights a crucial factor-analysts are trying to identify the absence of the normal, and the presence of the abnormal. The real decision-making and cognitive work occurs not by ticking off a set of criteria to reach a classification, but by dynamically interpreting signals to infer the behaviour of a contact and identifying when more information is needed or when there is a contradiction in what is expected and what is presented. This process can be understood in terms of the Recognition Primed Decision (RPD) model. SOs bring disparate, unrelated pieces of information together and construct a narrative around those pieces of information, and then test this against what they know and can observe to identify areas which are contradictory. They then seek more information to refine their narrative of the situation. The RPD Model has been applied in complex naval environments in other work and the process of sonar analysis appears to exemplify the same principles and cognitive processes.

Training

The first aspect provides a method of training a machine learning, ML, algorithm, the method implemented, at least in part, by a computer comprising a processor and a memory, the method comprising:

- providing training data comprising a set of audio signals, including a first audio signal, as respective bitstreams, corresponding with respective sets of watercraft;
- training the ML algorithm using the provided training data comprising detecting the respective sets of watercraft and classifying the detected respective sets of watercraft according to a set of classes, including a first class, based, at least in part, on a set of labels, including a first label, wherein the set of labels relates to propeller, propulsor, prime mover and/or submerged equipment associated with watercraft.

In this way, the trained ML algorithm may be used, as described below, to improve characterisation of contacts such as watercraft, for example to improve situational awareness, by improving detection, identification, classification and/or monitoring of contacts. Particularly, the trained ML algorithm may be used to inter alia classify the watercraft using labels that are consistent with the cognitive constructs of sonar operators, thereby providing to the sonar operators an understanding of decision-making strategies used for contact classification by the ML algorithm, for verification and/or validation.

The method is of training the ML algorithm. Training of ML algorithms using audio datasets, for example for speech recognition, is known.

General-purpose speech recognition is typically based on Hidden Markov Models (HMMs). HMMs may be used in speech recognition because a speech signal, over a short timescale (for example, 10 ms), may be considered as a piecewise stationary signal or a short-time stationary signal. Dynamic time warping (DTW) may also be used for speech recognition. Neural networks (NNs) make fewer explicit assumptions about feature statistical properties than HMMs, and thus may be preferred for speech recognition. When used to estimate probabilities of a speech feature segment, NNs allow discriminative training in a natural and efficient manner. However, in spite of their effectiveness in classifying short-time units such as individual phonemes and isolated words, early NNs were rarely successful for continuous recognition tasks because of their limited ability to model temporal dependencies. One approach to this limitation was to use NNs as a pre-processing, feature transformation or dimensionality reduction step prior to HMM based recognition. However, more recently, long short-term memory (LSTM) and related recurrent neural networks (RNNs) and Time Delay Neural Networks (TDNNs) have demonstrated improved performance in this area. Deep Neural Networks (DNNs) and Denoising Autoencoders are also under investigation. A deep feedforward neural network (DNN) is an artificial neural network with multiple hidden layers of units between the input and output layers. Similar to shallow neural networks, DNNs can model complex non-linear relationships. DNN architectures generate compositional models, where extra layers enable composition of features from lower layers, giving a huge learning capacity and thus the potential of modelling complex patterns of speech data.

In one example, the ML algorithm comprises a neural network, NN, preferably a convolutional NN, CNN, more preferably a deep CNN, DCNN, preferably wherein the ML algorithm comprises a DCNN and wherein training the ML algorithm using the provided training data comprises training at most N upper layers of the DCNN, wherein N is a natural number greater than or equal to 1, for example 1, 2, 3, 4 or 5, preferably 1, 2 or 3, most preferably 2.

In contrast to speech and as discussed below, the set of audio signals correspond with the respective sets of watercraft and hence may relate to a propeller, a propulsor, a prime mover and/or submerged equipment associated with respective watercraft. In turn, the respective audio signals may be characterised by periodicity or beat, due, at least in part, to the propeller, the propulsor, the prime mover and/or the submerged equipment associated with respective watercraft. Hence, an aim of training the ML algorithm may be to train based, at least in part, on such beat or periodicity, if present in the set of audio signals.

Nevertheless, ML algorithms for speech recognition may be used in the method according to the first aspect. In one example, the ML algorithm comprises a neural network, NN, preferably a recurrent NN, RNN, more preferably a long short-term memory, LSTM.

Long short-term memory (LSTM) is an artificial recurrent neural network (RNN) architecture, used in deep learning. Unlike standard feedforward NNs, LSTM includes feedback connections. LSTM may be used to process single data points (such as images) and data sequences (such as audio or video). A common LSTM unit is composed of a cell, an input gate, an output gate and a forget gate. The cell remembers values over arbitrary time intervals and the three gates regulate the flow of information into and out of the cell. LSTM networks are particularly suited to classifying, processing and making predictions based on time series data, since there can be lags or gaps of unknown duration between important events in a time series. LSTMs were developed to deal with the exploding and vanishing gradient problems that can be encountered when training traditional RNNs. Relative insensitivity to gap length is an advantage of LSTM over RNNs, hidden Markov models and other sequence learning methods.

LSTMs may be preferred for the method according to the first aspect because a periodicity or beat, due, at least in part, to the propeller, the propulsor, the prime mover and/or the submerged equipment associated with respective watercraft may include artefacts such as lapses (i.e. missing beats), changes in periodicity such as due to Doppler effects, interference audio effects between multiple propellers and/or external noise, for example. Since LSTMs include feedback connections, the effect of such artefacts on training the ML algorithm may be attenuated and/or overcome.

While other audio signals, for example music, may be characterised by periodicity or beat, software for identifying songs, for example Shazam, typically compares a spectrogram (i.e. an audio fingerprint) obtained for a part of a particular song against a database of spectrograms of parts of songs. Other software for identifying the beat of songs, for example Audacity, typically uses intensity thresholding and thus is unable to handle artefacts, as described. That is, such software is distinguished from the ML learning described herein.

The method is implemented, at least in part, by the computer comprising the processor and the memory. Suitable computers are known.

The method comprises providing the training data comprising the set of audio signals, including the first audio signal, as respective bitstreams corresponding with respective sets of watercraft.

In one example, the set of audio signals comprises N audio signals, wherein N is a natural number greater than or equal to 1, for example 1, 10, 20, 50, 100, 200, 500, 1000, 2000, 5000, 10000 or more. Suitable training data may be obtained from https://atlanttic.uvigo.es/underwaternoise/for example.

The respective bitstreams may originate from audio stored in an uncompressed audio format, for example WAV, AIFF, AU or raw header-less PCM, a lossless compression audio format, for example FLAC, TTA, ATRAC Advanced Lossless, ALAC MPEG-4 SLS, MPEG-4 ALS, MPEG-4 DST, Windows Media Audio Lossless (WMA Lossless), and Shorten (SHN) and/or a lossy compression audio format, for example Opus, MP3, Vorbis, Musepack, AAC, ATRAC and Windows Media Audio Lossy (WMA lossy). Additionally and/or alternatively, the audio signals may originate from audio stored in a multimedia or video format. Additionally and/or alternatively, the audio signals may originate from a hydrophone, at least in part. The audio format may affect audio data therein (for example, due to frequency band, sampling and/or compression.

The respective bitstreams relate to the set of watercraft. In one example, the first audio signal as a first bitstream relates to a first watercraft. It should be understood that by relating to the first watercraft, the first audio signal may be obtained directly or indirectly from the first watercraft, for example by recording the set of propellers thereof using a hydrophone, for example. Additionally and/or alternatively, it should be understood that by relating to the first watercraft, the first audio signal may be obtained for the first watercraft, for example by generation thereof for the first watercraft, as described below. In one example, the set of audio signals includes a plurality of audio signals relating to the first watercraft, for example at different speeds, under different loads, during acceleration and/or during manoeuvres.

In one example, the set of watercraft includes military, merchant and/or pleasure watercraft, including surface and sub-surface watercraft. Military watercraft classes include: aircraft carriers; cruisers; destroyers; frigates; corvettes; large patrol vessels; minor surface combatants such as missile boats, torpedo boats and patrol boats including rigid inflatable boats (RIBs); mine warfare vessels such as mine countermeasures vessels; minehunters; minesweepers and minelayers; amphibious warfare vessels such as amphibious assault ships; dock landing ships; landing craft and landing ships; air-cushioned landing craft; submarines and/or submersibles such as ballistic missile submarines, guided missile submarines, nuclear-powered attack submarines, diesel-electric attack submarines; and torpedoes. Merchant watercraft classes include: container ships; bulk carriers; tankers; passenger ships such as ferries and cruise ships; coasters; and specialist ships such as anchor handling vessels, supply vessels, tugs, salvage vessels, research vessels, fishing trawlers and whalers. Pleasure (also known as recreational) watercraft classes include boats and yachts such as pontoons, bowriders, cabin cruisers, houseboats, trawlers, motor yachts and catamarans.

In one example, providing the training data comprises obtaining, at least in part, the first audio signal, for example using a hydrophone. That is, the first audio signal is recorded i.e. measured.

In one example, providing the training data comprises generating, at least in part, the first audio signal. That is, the first audio signal is synthesized, for example by combining two or more obtained or generated audio signals. In this way, relatively more complex audio signals may be provided, for example including two or more watercraft.

In one example, the first audio signal comprises frequencies in a range from 10 Hz to 30 kHz, preferably in a range from 20 Hz to 5 kHz. Generally, frequencies in a frequency range from 20 Hz to 20,000 Hz (also known as an audio range) are capable of being heard by human listeners and are known as audio or sonic frequencies. Speech of a typical adult male has a fundamental frequency from 85 to 180 Hz, while speech of a typical adult female has a fundamental frequency from 165 to 255 Hz. In contrast, the fundamental frequency of sounds arising from propellers may be lower, for example in a range from 10 Hz to 250 Hz, and thus a human listener may not be able to hear some of the sounds. Depending on the audio format, a usable frequency band may be restricted, for example from 300 Hz to 3,400 Hz or from 50 Hz to 7 kHz for high definition audio. That is, the fundamental frequency may be lower than the lower limit of such a band. Hence, rather than listening to a fundamental frequency, a human listener typically instead listens to only a part of a harmonic series of the fundamental frequency. However, by listening to the part of the harmonic series, an impression of hearing the fundamental frequency may be created. Where the audio format includes sampling of the original audio, per the Nyquist-Shannon sampling theorem, the sampling rate must be at least twice the highest component of the frequency via appropriate filtering prior to sampling at discrete times, for effective reconstruction of the audio signal. In one example, an audio signal, for example the first audio signal, of the set of audio signals has a fundamental frequency in a range from 5 Hz to 500 Hz, preferably in a range from 10 Hz to 250 Hz. In one example, an audio signal, for example the first audio signal, of the set of audio signals has a frequency band in a range from 5 Hz to 50 kHz, preferably in a range from 10 Hz to 10 KHz.

In one example, the first audio signal corresponds, at least in part, with a set of rotating propellers, including a first rotating propeller, defined based, at least in part, on propeller information including at least one of a number of propellers, a type of propeller, a number of blades, a propeller characteristic, a blade characteristic, a rotational speed and a shaft characteristic and/or wherein the first audio signal corresponds, at least in part, with a set of propulsors, including a first propulsor, defined based, at least in part, on propulsor information including at least one of a type of propulsor and a propulsor characteristic.

In one example, the number of propellers is P, wherein P is a natural number greater than or equal to 1, for example 1, 2, 3, 4, 5, 6 or more. Generally, each propeller is coupled to a different shaft though the different shafts may be turned by the same prime mover, for example.

Types of propellers include fixed-pitch propellers, controllable-pitch propellers, skewback propellers, modular propellers and Voith Schneider propellers. Controllable-pitch propellers have advantages over fixed-pitch propellers including less drag depending, the ability to move the sea craft backwards, and the ability to use the vane-stance, which gives the least water resistance when not using the propellers. The blade tips of a skewback propeller are swept back against the direction of rotation. In addition, the blades are tilted rearward along the longitudinal axis, giving the propeller an overall cup-shaped appearance. This design preserves thrust efficiency while reducing cavitation, and thus makes for a quiet, stealthy design. A small number of ships use propellers with winglets similar to those on some airplanes, reducing tip vortices and improving efficiency. A modular propeller provides more control over the boat's performance. There is no need to change an entire propeller: a single blade may be replaced for example to change the pitch or replace a damaged blade. Voith Schneider propellers use four untwisted straight blades turning around a vertical axis instead of helical blades and can provide thrust in any direction at any time, at the cost of higher mechanical complexity.

In one example, the number of blades is B, wherein B is a natural number greater than 1, for example 2, 3, 4, 5, 6 or more. Generally, marine screw propellers usually have 3, 4 or 5 similar blades, of which four blades is the most common, and the number is selected based on design requirements. Two-bladed propellers are typically used on sailing ships with auxiliary power, as they offer the lower resistance when in the sailing condition.

It should be understood that a blade characteristic relates to an individual blade of the set of a propeller and may distinguish that individual blade from the remaining blades. For example, a blade characteristic may include: damage to the blade, such as due to cavitation, wear and/or contact (e.g. bending, cracking and/or fracturing); debris attached thereto such as tangled items or molluscs thereon; dissimilarity such as dissimilar design (for example an unmatched blade) or a different pitch. Particularly, the inventors have determined that such individual blade characteristics may be determinative in training the ML algorithm and successfully inferring rotational speeds of propeller shafts from audio signals, because sound associated with such individual blade characteristics may be discriminated from other sounds.

Hydroacoustics is the study and application of sound in water. Hydroacoustics, using sonar technology for example, is typically used for monitoring underwater physical and biological characteristics. Hydroacoustics may be used to detect the depth of a water body (bathymetry), as well as the presence or absence, abundance, distribution, size, and behaviour of underwater plants and animals, as well as sea craft. Hydroacoustic sensing involves passive acoustics (i.e. listening for sounds) or active acoustics (i.e. making a sound and listening for the echo).

The term acoustic signature may be used to describe a combination of acoustic emissions of sound emitters of sea craft, such as ships and submarines. The acoustic signature is made up of a number of individual signals including: machinery noise, caused by, for example, the sea craft's engine(s), propeller shaft(s), fuel pump(s), air conditioning system(s); cavitation noise, caused by the creation of gas bubbles during rotation of the sea craft's propeller(s); and hydrodynamic noise, caused by the movement of water displaced by the hull of a moving vessel. One of the main causes of hydroacoustic noise from fully submerged lifting surfaces is the unsteady separated turbulent flow near the surface's trailing edge that produces pressure fluctuations on the surface and unsteady oscillatory flow in the near wake. The relative motion between the surface and the ocean creates a turbulent boundary layer (TBL) that surrounds the surface. The noise is caused by the fluctuating velocity and pressure fields within this TBL. These acoustic emissions may depend, at least in part, on the sea craft's hull dimensions, installed machinery and displacement. Hence, different ship classes may have different combinations of acoustic signals that together form a unique signature. The acoustic signature of a sea craft may be reduced by design considerations including: installing machinery having the best possible mechanical tolerances and designed to produce a minimum of noise; decoupling the machinery from the hull by mounting machinery on rubber mounting blocks; designing propellers to reduce cavitation, such as the development of large slow turning propellers; fitting of anechoic tiles to the hull (though poorly fitting and/or loose anechoic tiles may be a source of noise; hydrodynamic efficiency to minimise the perturbation of water; and or care in minimising protrusions from the hull. Such design considerations are typically applied to military sea craft. However, some of those design considerations, such as mechanically-toleranced machinery, propellers for reduced cavitation, hydrodynamic efficiency and/or minimising hull protrusions are important for merchant sea craft also, since they increase fuel efficiency, for example.

Hence, the first audio signal, for example, may comprise noise caused by the set of rotating propellers, machinery and/or movement of a watercraft's hull through the water.

Typical frequencies associated with underwater acoustics are between 10 Hz and 1 MHz. The propagation of sound in the ocean at frequencies lower than 10 Hz is usually not possible without penetrating deep into the seabed, whereas frequencies above 1 MHz are rarely used because they are absorbed very quickly. Underwater acoustics is sometimes known as hydroacoustics.

Underwater acoustic propagation depends on many factors. The direction of sound propagation is determined by the sound speed gradients in the water, which transform the sound wave through refraction, reflection and dispersion. In the sea, the vertical sound speed gradients are generally much larger than the horizontal sound speed ones. Combining this with a tendency towards increasing sound speed at increasing depth, due to the increasing pressure in the deep sea, causes a reversal of the sound speed gradient in the thermocline, creating an efficient waveguide at the depth, corresponding to the minimum sound speed. The sound speed profile may cause regions of low sound intensity called Shadow Zones, and regions of high intensity called Caustics.

At equator and temperate latitudes in the ocean, the surface temperature is high enough to reverse the pressure effect, such that a sound speed minimum occurs at depth of a few hundred metres. The presence of this minimum creates a special channel known as Deep Sound Channel, permitting guided propagation of underwater sound for thousands of kilometres without interaction with the sea surface or the seabed. Another phenomenon in the deep sea is the formation of sound focusing areas, known as Convergence Zones. In this case sound is refracted downward from a near-surface source and then back up again. The horizontal distance from the source at which this occurs depends on the positive and negative sound speed gradients. A surface duct can also occur in both deep and moderately shallow water when there is upward refraction, for example due to cold surface temperatures. Propagation is by repeated sound bounces off the surface.

In general, as sound propagates underwater there is a reduction in the sound intensity over increasing ranges, though in some circumstances a gain can be obtained due to focusing. Propagation loss (sometimes referred to as transmission loss) is a quantitative measure of the reduction in sound intensity between two points, normally the sound source and a distant receiver. At short range the propagation loss is dominated by spreading while at long range it is dominated by absorption and/or scattering losses.

Under water sounds may also be affected by reverberation, Doppler shift, intensity fluctuations and non-linearity.

Transient sounds result in a decaying background that can be of much larger duration than the original transient signal. The cause of this background, known as reverberation, is partly due to scattering from rough boundaries and partly due to scattering from fish and other biota. For an acoustic signal to be detected easily, it must exceed the reverberation level as well as the background noise level.

If an underwater object is moving relative to an underwater receiver, the frequency of the received sound is different from that of the sound radiated (or reflected) by the object. This change in frequency is known as a Doppler shift. The shift can be easily observed in active sonar systems, particularly narrow-band ones, because the transmitter frequency is known, and the relative motion between sonar and object can be calculated. Sometimes the frequency of the radiated noise (a tonal) may also be known, in which case the same calculation can be done for passive sonar. For active systems, the change in frequency is 0.69 Hz per knot per KHz and half this value for passive systems as propagation is only one way. The shift corresponds to an increase in frequency for an approaching target.

Though acoustic propagation modelling generally predicts a constant received sound level, in practice there are both temporal and spatial fluctuations. These may be due to both small and large-scale environmental phenomena. These can include sound speed profile fine structure and frontal zones as well as internal waves. Because in general there are multiple propagation paths between a source and receiver, small phase changes in the interference pattern between these paths can lead to large fluctuations in sound intensity.

In water, especially with air bubbles, the change in density due to a change in pressure is not exactly linearly proportional. As a consequence, for a sinusoidal wave input additional harmonic and subharmonic frequencies are created. When two sinusoidal waves are input, sum and difference frequencies are created. The conversion process is greater at high source levels than small ones. Because of the non-linearity there is a dependence of sound speed on the pressure amplitude so that large changes travel faster than small ones. Thus, a sinusoidal waveform gradually becomes a sawtooth one with a steep rise and a gradual tail. Use is made of this phenomenon in parametric sonar and theories have been developed to account for this, e.g. by Westerfield.

In one example, the first audio signal corresponds, at least in part, with a set of prime movers, including a first prime mover, defined based, at least in part, on propulsor information including at least one of a type of propulsor (for example diesel, electric or steam) and a propulsor characteristic.

In one example, the first audio signal corresponds, at least in part, with submerged equipment associated with the respective sets of watercraft, for example chains, nets, anchors, etc.

The acoustic signature may comprise noise caused by a set of rotating propellers, machinery and/or movement of a watercraft's hull through the water, as described previously, for example. In order to infer the rotational speed of the set of rotating propellers, the noise caused thereby must be resolved or distinguished from the other noises. In one example, an audio signal, for example the first audio signal, of the set of audio signals has an acoustic signature, wherein the acoustic signature is represented by a spectrogram of the audio signal, for example a mel-frequency cepstrum, MFC, spectrogram, a linear spectrogram or a logarithmic spectrogram.

In one example, providing the training data comprises creating a set of spectrograms, including a first spectrogram, from the set of audio signals, wherein the first spectrogram corresponds with the first audio signal. In one example, the first spectrogram comprises and/or is mel-frequency cepstrum, MFC, spectrogram, a linear spectrogram or a logarithmic spectrogram.

In one example, an audio signal, for example the first audio signal, of the set of audio signals has a period (also known as periodicity) and/or a set of tempos, including a first tempo. The period is defined as the mean time between successive, similar sounds due to a set of rotating propellers, for example a first rotating propeller particularly a first or specific blade thereof, noting that at least some of such sounds may not be detected (i.e. gaps in the time series). The first tempo (also known as beat) is thus the inverse of the period. The set of tempos may include a plurality of tempos, for example having longer or shorter periods and may be due to other rotating propellers and/or other causes of noise, for example.

In one example, the audio signal information includes one or more of depth information (i.e. depth of recording), recording information (e.g. type of hydrophone and/or recording parameters), location information (e.g. longitude, latitude, depth), temperature information (e.g. of water), distance information (e.g. from hydrophone to sea craft).

The method comprises detecting the respective sets of watercraft from the corresponding set of audio signals, for example as described above.

The method comprises classifying the detected respective sets of watercraft according to the set of classes, including the first class.

In one example, the set of classes includes military, merchant and/or pleasure watercraft, including surface and sub-surface watercraft, for example as described above with respect to the set of watercraft. In one example, the set of classes includes small merchant ship, medium merchant ship, large merchant ship, fishing vessel, for example as defined by Table 1.

The method comprises classifying the detected respective sets of watercraft according to the set of classes, including the first class based, at least in part, on the set of labels, including the first label, wherein the set of labels relates to propeller, propulsor, prime mover and/or submerged equipment associated with watercraft.

It should be understood that the labels of the set thereof are human interpretable, for example consistent with the cognitive constructs of sonar operators. The labels of the set thereof may be used to label the training data, for example. In one example, the set of labels includes motion, signature, clarity, mechanism, engine configuration, speed, engine movement, propeller and pattern, for example as described with respect to Tables 2 to 4. The labels are defined thus: Motion-Relating to the motion of a ship in the water, and the qualities of the noise made as propellers break the surface; Signature—Encompassing a range of sounds relating to engine type, vessel's depth in the water, whether the vessel is empty or heavy; Clarity—Relating to the quality of the sound of an engine; Mechanism—Relating to the type of generator (diesel versus steam); Engine Configuration-Relating to the number of blades or shafts specifically; Speed—Relating predominantly to movement, speed of movement, firing rate; Engine Movement—Relating to the movement of blades and shafts; Propeller—Relating to the configuration of blades and shafts as a whole; Pattern—Relating to whether there is a clear visual pattern emerging from the spectrogram.

Classifying

The second aspect provides a method of classifying watercraft, the method implemented, at least in part, by a computer comprising a processor and a memory, the method comprising: obtaining a first audio signal corresponding with a first set of watercraft, including the first watercraft, for example using a hydrophone; and inferring a first class of a set of classes, representing the first watercraft, using a trained ML algorithm and the obtained first audio signal, for example wherein the ML algorithm is trained according to the first aspect.

In this way, the first watercraft, for example a contact, may be classified, thereby improving situational awareness.

The computer, the processor, the memory, the first audio signal, the first set of watercraft, the first watercraft, the hydrophone, the first class, the set of classes and/or the ML algorithm may be as described with respect to the first aspect. The method according to the second aspect may include any step described with respect to the first aspect mutatis mutandis.

In one example, the method comprises providing the computer aboard a watercraft, preferably a sub-surface watercraft for example a submarine or a submersible. Particularly, situational awareness aboard such sub-surface watercraft may be limited to information obtained via sonar. In one example, the watercraft is communicatively isolated, for example unable to receive transmissions.

In one example, the method comprises displaying, for example on a display communicatively coupled to the computer, a first set of labels, including a first label, wherein the first set of labels relates to propeller, propulsor, prime mover and/or submerged equipment associated with watercraft, of the first class representing the first watercraft. In this, a human user may validate and/or verify a classification of the first watercraft. In one example, the first set of labels are displayed as a grid or table, such as a Visual Intelligent Narrative of Autonomous Systems (VINAS) table as described below. In one example, displaying the first set of labels is responsive to selecting, for example by a human user, the first watercraft, such as via a user interface for monitoring the first set of watercraft. In one example, the method comprises displaying, for example on a display communicatively coupled to the computer, respective representations of the set of watercraft, including the first watercraft, for example via a user interface, preferably a graphical user interface. In this way, a human user may monitor the set of watercraft and interact with the respective representations thereof.

In one example, the method comprises displaying a second set of labels, including a first label, wherein the set of second labels relates to propeller, propulsor, prime mover and/or submerged equipment associated with watercraft, of the first class representing the first watercraft. In this way, a human user may compare and/or contrast the first set of labels and the second set of labels, which may be displayed side by side, for example. For example, another audio signal may be obtained for the first watercraft and the set of labels re-selected accordingly. For example, the human operator may select a different set of labels, potentially reclassifying the first class.

In one example, the method comprises outputting the first audio signal, responsive to a request, for example from a human user. In this way, a human operator may listen to the first audio signal, for example to validate and/or verify a classification of the first watercraft.

In one example, the method comprises reclassifying the first class, representing the first watercraft, responsive to re-selection of the set of labels, for example by a human user. In this way, the classification is interactive, enabling a human user to re-select the set of labels such as based on listening to the first audio signal, for example.

In one example, the method comprises training the ML algorithm using the first audio signal, based on reclassifying the first class, representing the first watercraft, responsive to re-selection of the set of labels. In this way, training of the ML algorithm is improved, for example based on input from a human user. In one example, the method comprises rewarding the ML algorithm based on validation and/or verification of the first class of the first watercraft, for example based on input from a human user. In this way, training of the ML algorithm is improved, for example based on input from a human user.

In one example, the method comprises obtaining a second audio signal corresponding with the first set of watercraft, including the first watercraft, for example using a hydrophone; and inferring the first class of a set of classes, representing the first watercraft, using the trained ML algorithm, the obtained second audio signal and optionally the obtained first audio signal. In this way, the classification of the first watercraft may be updated using the obtained second audio signal.

In one example, the method comprises reclassifying the first class, representing the first watercraft, responsive to receiving information related to the first watercraft. For example, a human operator may input complementary information, such as obtained from other sensors.

In one example, the method comprises comprising determining a location, a bearing, a velocity, an acceleration, a manoeuvre and/or an activity of the first watercraft, using the trained ML algorithm and the obtained first audio signal. In this way, the first watercraft may be monitored.

In one example, the first audio signal comprises frequencies in a range from 10 Hz to 30 kHz, preferably in a range from 20 Hz to 5 kHz, as described with respect to the first aspect.

In one example, the first audio signal corresponds, at least in part, with a set of rotating propellers, including a first rotating propeller, defined based, at least in part, on propeller information including at least one of a number of propellers, a type of propeller, a number of blades, a propeller characteristic, a blade characteristic, a rotational speed and a shaft characteristic and/or wherein the first audio signal corresponds, at least in part, with a set of propulsors, including a first propulsor, defined based, at least in part, on propulsor information including at least one of a type of propulsor and a propulsor characteristic, as described with respect to the first aspect.

In one example, the first audio signal corresponds, at least in part, with a set of prime movers, including a first prime mover, defined based, at least in part, on prime mover information including at least one of a type of prime mover and a prime mover characteristic, as described with respect to the first aspect.

In one example, the first audio signal corresponds, at least in part, with submerged equipment associated with the respective sets of watercraft, as described with respect to the first aspect.

Computer, Computer Program and Non-Transient Computer-Readable Storage Medium

The third aspect provides a computer comprising a processor and a memory configured to implement a method according to the first aspect and/or the second aspect.

The fourth aspect provides a computer program comprising instructions which, when executed by a computer comprising a processor and a memory, cause the computer to perform a method according to the first aspect and/or the second aspect.

The fifth aspect provides non-transient computer-readable storage medium comprising instructions which, when executed by a computer comprising a processor and a memory, cause the computer to perform a method according to the first aspect and/or the second aspect.

Definitions

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIG. 1 schematically depicts an example of a completed repertory grid performed with the ex-SO SME with hydrophone recording elements;

FIG. 2 schematically the repertory grid of FIG. 1 in which the first grouping removed, the process repeated, and a second grouping emerges to become concept "signature";

FIG. 3 schematically depicts an example of a blank VINAS grid created from the SO and ST responses;

FIGS. 4A to 4E schematically depict examples of a VINAS grid using SO responses, coloured for each vessel recording;

DETAILED DESCRIPTION OF THE DRAWINGS

Method

Figure 4A:
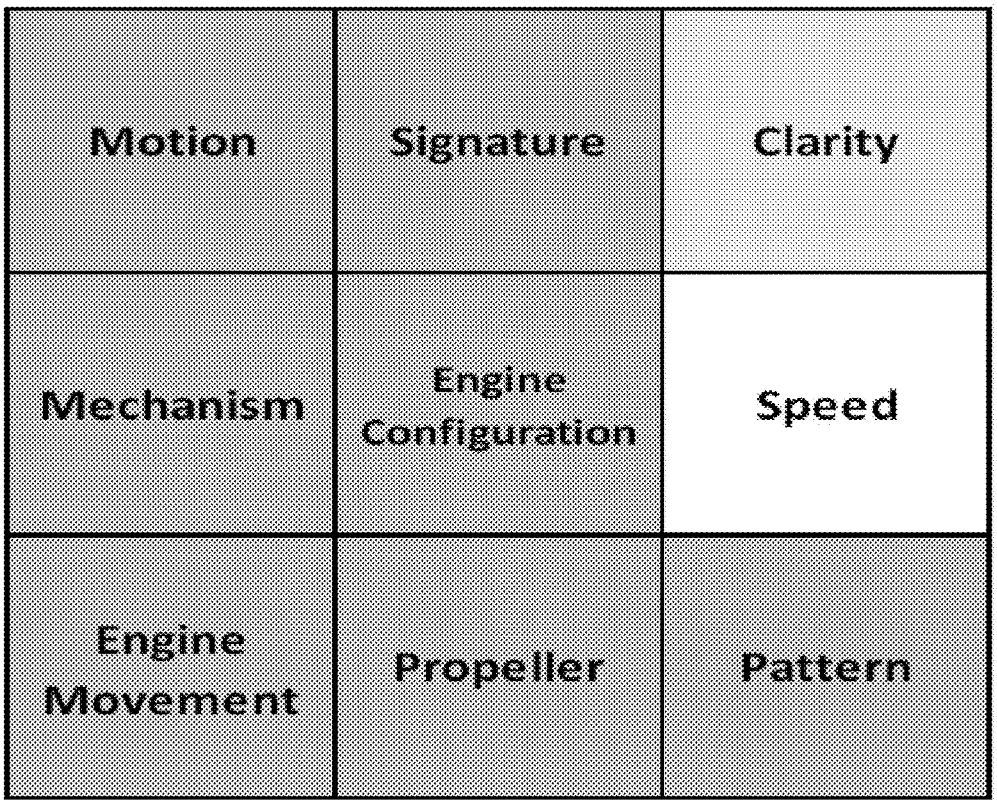
Figure 4B:
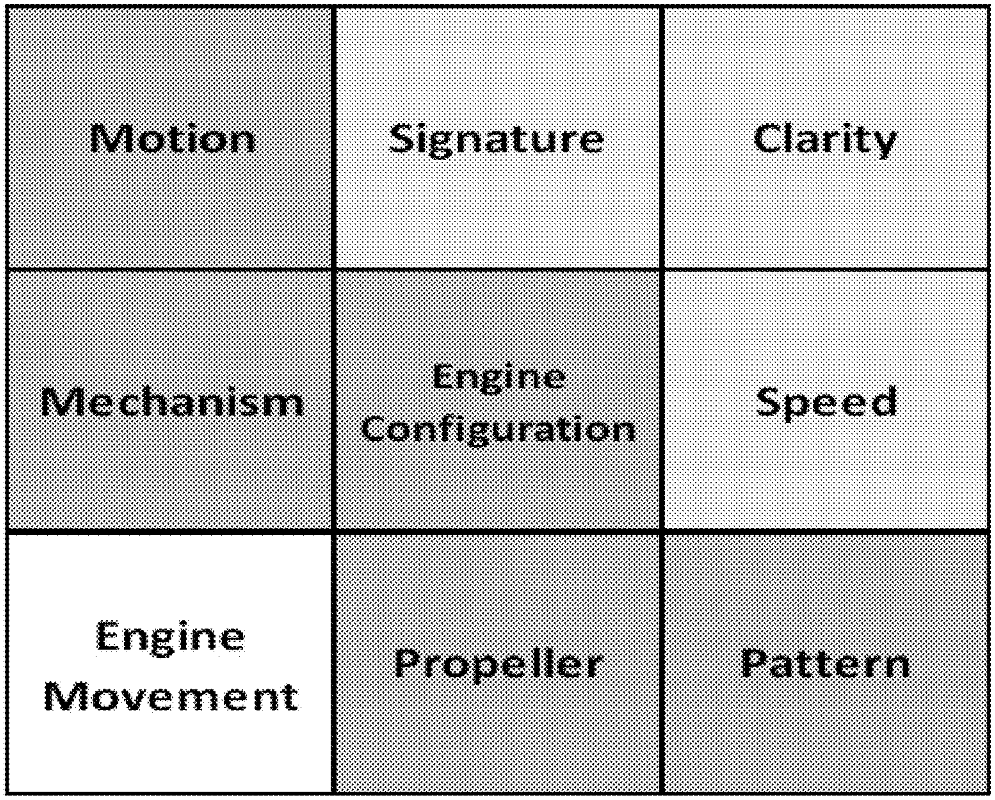
Figure 4C:
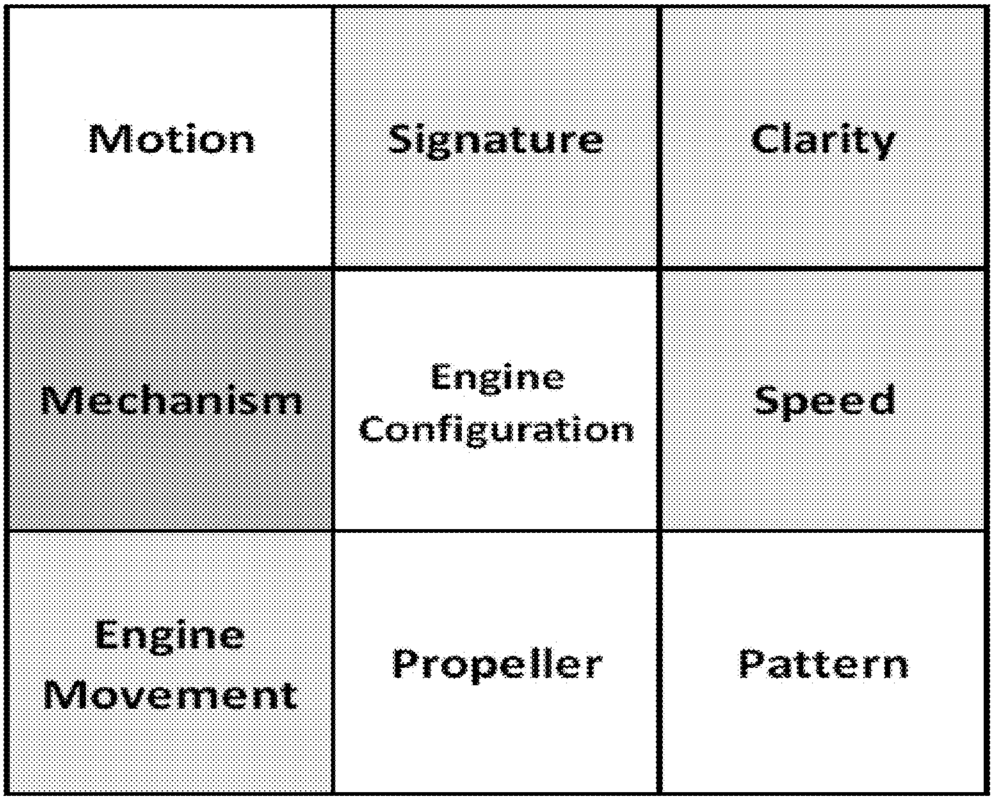
Figure 4D:
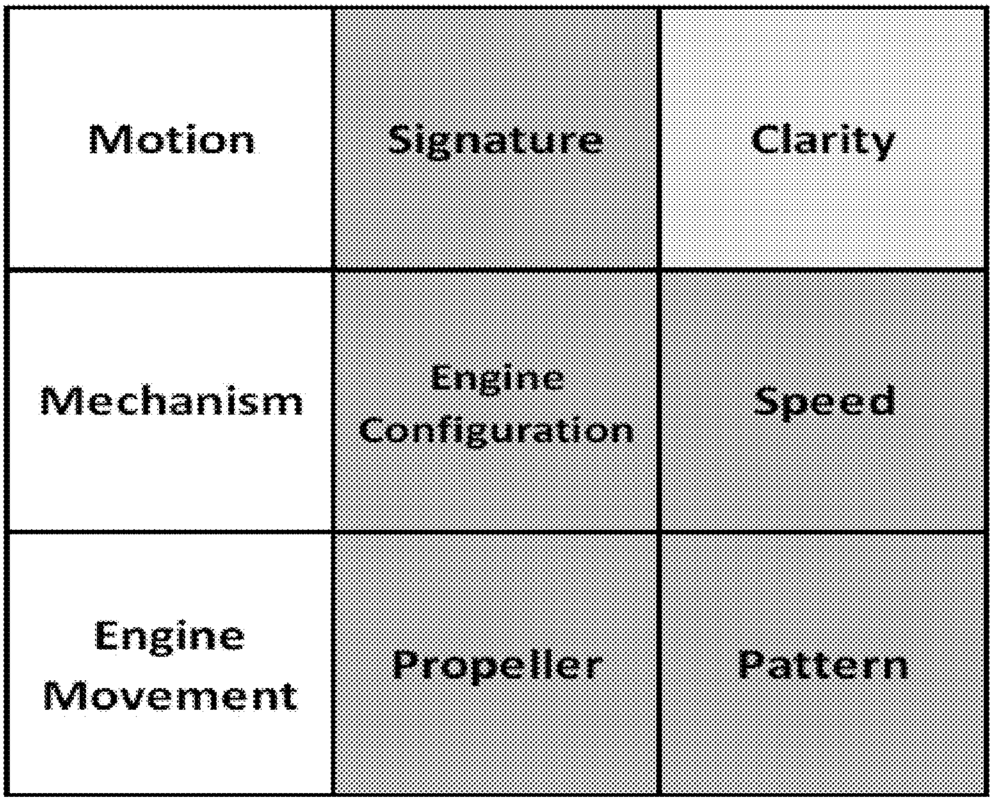

The repertory grid is an interview technique and cognitive analysis tool, used to help identify commonalities and themes in how individuals relate and classify different ideas. It was developed to support psychotherpy interviews in the 1950s. It is a cognitive mapping technique that seeks to discover how interviews construct internal representations of their environment. It is proposed that this is a useful means of gaining access to the 'frames' are used in sound analysis, particularly when these frames might rely on tacit knowledge and be difficult to put into words.

The study was performed by a group of four sound engineers with an average of five years' experience in audio recording and production. These were compared with three SMEs who had different levels of experience of sonar analysis. These were an ex-RN Sonar Operator (SO), whose main responsibility during active service was to monitor and classify contacts using sonar analysis; an ex-RN Officer of the Watch (OOW), whose main responsibilities would have been to ensure the maritime platform navigates safely and avoids collisions; and a current RN Sonar Trainer (ST) with experience in training future sonar analysis, plus additional experience of Anti-Submarine Warfare aboard a surface ship.

A sample of five hydrophone recordings were used to form the "elements" in the repertory grid. These identified different size vessels, with other prominent features audible such as trawling fishing nets, "blade slap" and "shaft rub" (Table 1).

TABLE 1

Descriptions of the five repertory grid elements and their key aural features.

| Element | Description |
|---|---|
| 1 | Medium merchant vessel |
| 2 | Small merchant vessel |
| 3 | Large merchant vessel characterised by "blade slap", meaning it is light/empty of cargo: The vessel will be riding high in the water with the propeller not fully submerged. |
| 4 | Large merchant vessel characterised by "shaft rub": the sound of poorly machined propeller shafts or worn bearings. |
| 5 | Fishing vessel characterised by "trawl noise", the sound of trawling nets behind a fishing vessel; heard as clunking and tinkling sounds as the bobbins and chains contact the seabed |

These recordings were combined into ten "triads", i.e., sets of three recordings. There were ten unique triads in total. For each triad, participants were asked to describe how two of the recordings were similar, and distinct from, the third, providing a word or phrase which would become a construct in the repertory grid (column 1 in FIG. 1). Once all ten triads had been assessed, participants were asked to define an opposing word or phrase for each construct, becoming the contrast (column 7 in FIG. 1). Each recording was then rated against each construct/contrast pair, i.e., with a '1' indicating that the recording fit the construct and '0' for the contrast. Relevant constructs of FIG. 1 are defined thus: Diesel—The identifiable sound of diesel propulsion, as opposed to ambient noise; In-Out—As a propeller from a vessel sits on or near the surface of the water and changes depth, the cavitation noise changes in quality and intensity; Blade Flutter—The noise made as the rate of flow of water over blades fails to carry cavitation bubbles downstream before it is effected by the high-pressure region in front of the next blade; Whine—A whining noise produced by errors in tooth gears meshing and hobbing when a propeller speed changes; Engine—The presence of a clear engine noise that is not muffled; Diesel Engine—The sounds made by a diesel engine in contrast to the sound made by a steam generator; Cavitation—The sound of pressure bubbles popping, indicating a propeller moving in the water.

This process was repeated with triads of spectrograms, a visual representation of an audio signal over time containing frequency and signal strength information.

Derivation of the cognitive concepts from the repertory grid was based on the methodology outlined by (Baber, 1996, 2015). Once the repertory grid table was constructed (FIG. 1), analysis develops by creating a 'template' that splits responses into roughly two groups. This allows the constructs to be translated into a smaller number of hypothetical variables (Concepts) which explain the maximum possible variance. This was done by totalling the scores for each element and picking a value to split the scores, i.e., total row in FIG. 1. In this example, three of the values are above 6 and two are below 6. All columns with a total below the chosen value are recorded as "0" and each with a total of the chosen value or over is recorded as a "1". This template is then compared to each construct row. The total matches or "hits" for each construct is recorded, shown in column "Fla" (FIG. 1). Constructs are grouped together as a Concept, removed from the grid, and the analysis is performed again until all constructs are conceptualised (FIG. 2). From FIG. 1, it can be seen that the construct pair "in/out, consistent" matches the template completely, and so becomes its own grouping. This is then removed from the grid and the analysis is repeated to find the next conceptual grouping.

These concepts were then compared and contrasted across roles and expertise in sonar analysis, eliciting information requirements. It was clear that the SO and OOW had very distinct information requirements to perform their roles. This allowed for the identification of which concepts were important to visualise in terms of classification. Concepts were visualised in a grid design and coloured depending on how many of the constructs within the concept had been recorded as fitting the signal (see FIG. 3).

Results

The way the sounds were interpreted differed depending on the level of domain knowledge and role of the participant. As we might expect, there was a difference in the interpretation of the sounds when comparing participants with previous experience of sonar analysis to those who had none. There were large differences between the constructs and concepts between Submariners and the sound engineers. Further, while the SO, OOW and ST had some similarities in their Constructs, their overarching concepts differed, and the concepts show concentration dependant on their role, therefore having different supporting informational requirements.

Hydrophone Recordings

Focusing firstly on the perception of audio recordings, there was a difference in response across all participants, in terms of focus and level of detail of analysis.

The sound engineers tended to interpret the recordings through a frame focused on recording quality. Their interpretations did not seek to identify semantics, but focused on the aural properties of the sounds. Constructs identified using the repertory grid concerned clarity, pitch, and rhythm, which seems to match with their expected domain knowledge, involving the production of high quality, clear audio signals. This could be described as surface analysis—the sound engineers were not interested in identifying what was being recorded, but instead, explored the recording medium itself. The construct "mechanical" was provided by 75% of participants, however no mechanism was identified, in contrast to the responses of participants familiar with sonar analysis, who all identified a mechanism ("engine", "diesel"), but to a different resolution depending on their focus. Uniquely, the sound engineering group commented on frequency information within the recordings without reference to the spectrograms, inferring frequency information from audio analysis in contrast to visual analysis.

TABLE 2

Conceptual groupings of constructs for SO listening to recordings

| Concept | Construct | Contrast |
|---|---|---|
| Motion | In-out | Consistent |
| | Diesel | Quiet |
| | Blade flutter | Blade slap |
| | Whine | Hum |
| | Flutter | Compressed cavitation |
| Clarity | Engine cavitation | Muffled |
| | | Shaft |
| Mechanism | Diesel engine | Steam generator |

The SO and ST conceptualised the sounds into categories related to engine characteristics and movement. The SO inferred noises relating to engines in every recording, unlike the sound engineers, and at a finer resolution in comparison to the OOW. For the SO, the focus was on identifying characteristics of the engine, to identify engines, mechanisms and auditory features of engine propellers and shafts, were grouped under the concept of "signature" (Table 3). By determining a specific combination of these sounds and configurations of propellers and shafts, it is possible to classify a contact, so this is aligned with the SO's main duties, which are to detect, track and classify contacts.

Interestingly, the SO uses "diesel" as a construct which contrasts with "quiet", but also "diesel engine", contrasted with "steam generator". The word "diesel" is used in two distinct ways; in the former, in the sense of safety (as without it the presence of diesel noise, there is uncertainty of the contact's location), grouped in the concept of "signature", and in the latter pair, as an engine mechanism, grouped in the "mechanism" concept. Clarity was one important conceptualisation the SO made, encompassing the construct contrast pair "muffled" and "engine", as the clearer the recording, the better suited it is for analysis, so in this sense the clarity of the engine characteristics in the recording are important. This is a different conceptualisation of "clarity" when compared with the sound engineers, who were interested in the quality of the medium itself and not the quality of a specific signal within the medium.

TABLE 3

Conceptual groupings of constructs for ST listening to recordings

| Concept | Construct | Contrast |
|---|---|---|
| Signature | Flutter | Rasp |
| | Propulsion | Propeller |
| Motion | Rotation | Stationary |
| | Diesel | Steam |
| Mechanism | Diesel engine | Steam propulsion |
| Cavitation | Cavitation | No cavitation |

The ST's conceptualisation concerned the engine configuration (table 4), in a similar way to the SO. If the SO is making a detailed assessment of configuration, the ST identifies some engine characteristics but not to such a detailed level as the SO. Both SO and ST identified characteristics relating to propellers in the water. Cavitation was a distinctive concept identified by the ST, again related to propellers and also to speed. They were concerned with engine movement, in a similar way to the SO, contrasting the terms "rotation" and "stationary", again having safety implications for a ship that may be still in the water. Their constructs identified specific classifiers that could be used in training or classification to build an aural signature of a contact in the same way the SO does in their "signature" conceptualisation.

TABLE 4

Conceptual groupings of constructs for OOW listening to recordings

| Concept | Construct | Contrast |
|---|---|---|
| Range | Diesel engine close range | Gas turbine long range |
| Sound source | Engine sound | Biological sounds |
| | Machinery | Organic |
| | Drive train | Oars |
| | Close range | Long range |
| | Machinery noise | Human noise |
| | Mechanical | Biological |
| Mechanism | Other internal systems | Propulsion chain |
| | Engine | Sails |
| Identity | Biological | Mechanical |

The OOW is responsible for the overall safety of a vessel and can override navigational decisions to maintain safety of a vessel. This means they are interested in the physical location of a contact in relation to their vessel, trying to create a three-dimensional mental model of their environment, therefore prioritising range in their conceptualisation is aligned with their primary role. Like the SO, the OOW was interested in the presence of mechanisms (table 5), but to a less granular degree; instead of identifying propeller and shaft configurations, they were trying to identify the pattern of life, whether the sounds were mechanical or organic or contained human noise. Safety was their largest encompassing conceptualisation, involving the identification of human noise, internal mechanism noise and engine noise, using this and the range conceptualisation to help visualise the objects in their environment and their positional relationship to each other and themselves. Broadly they were interested in whether the noise was derived from an engine or a biological source, and how close it was. Again, this is aligned with their main responsibility of safety and collision avoidance. They need less detailed information about what was used in the classification, but more information pertaining to locality in order to effectively make navigational decisions.

Spectrograms

The spectrograms provided the participants with additional information to the aural stimuli. Sound engineers gathered information about the smoothness of the signal and whether the visual pattern repeated over time or in a particular frequency band. Again, sound engineers were not interested in inferring classification characteristics from the visual information and instead described the visual pattern presented to them.

The SO gained insight on more dimensions when presented with visualised frequency information. Their predominant conceptualisations were concerned with specific engine configurations and speed. When presented with the ability to visualise distinct frequencies present in the recordings, instead of simply identifying the presence of engine parts, the SO was concerned with the specific number of these components. Being able to distinguish specific configurations of propellers and propeller shafts, supplemented with aural information, allows an SO to make an initial classification of a contact. The SO built on their mental model by beginning to interpret movement and speed, concerned with constructs such as "engine RPM", "engine firing rate" and "shaft RPM". This shows a fusion of aural and visual information in their classification process, utilising both to build a more detailed understanding of the structure of a contact, as both are required in order to identify the presence, and number of, specific engine components, and interpret their behaviour.

The OOW interpreted the visual information in a similar way to the sound engineers, conceptualising the shape and rhythm of the signal presented, and identifying patterns in its appearance. Like the SO, they infer additional movement information from the spectrograms, conceptualising whether there is rotation occurring.

The ST was concerned with identifying visual patterns in the spectrograms, focusing on the behaviour of the signal in terms of frequency intensity, diffusion and fundamentals. They conceptualised the "pattern" of the signal, its level of "regularity", its "similarity" and its "clarity"; here a methodological understanding can be seen, concerned with whether the signal has a consistent, recognisable pattern, or whether there are areas obscured by a lack of clarity, or dissimilarities to what they expect to see. The ST spoke about the "absence of the normal, the presence of the abnormal", trying to find incongruencies between what is displayed and what they conceptualise as the classification, exampling a visual form of abductive reasoning.

Like the SO, the ST conceptualised "speed", with the pair "fast" and "slow", increasing understanding when presented with a visual representation of the signal, concerned with the movement of a contact.

VINAS Design

Concepts elicited through the repertory grid technique were visualised in a grid (FIG. 3).

Concepts were coloured depending on how many "hits" for the constructs present within them were recorded for a given vessel recording. Thus, it was possible to see the differences in how each vessel had been conceptualised (FIGS. 4A to 4E). This grid was derived from the SO repertory grid responses, but with the inclusion of "pattern" from the ST response as this concept contained distinct information that could be used in frequency analysis. This was compared with classification guidance, and we found a high level of agreement with processes employed in classification.

FIGS. 4A to 4E compare grids for: medium merchant vessel (FIG. 4A); small merchant vessel (FIG. 4B); large merchant vessel with characteristic blade slap (FIG. 4C); large merchant vessel with characteristic shaft rub (FIG. 4D); and fishing vessel trawling nets (FIG. 4E). The grids were made for the role of SO, coloured using SO repertory grid responses. Concepts with all constructs present are coloured green. Concepts with some constructs present are coloured yellow. Concepts with no constructs present are not coloured.

As can be seen in FIGS. 4A to 4E, each grid was distinct, depending on which vessel was being represented. Differences can be quickly visually assessed, and areas with few hits, showing a lack of information or ambiguity, can be quickly identified, and explored.

We propose that repertory grid provides a convenient means of identifying the frames used by sonar operators, and this, in the VINAS visualisation provides an aide memoire that could be used to present the results from an autonomous decision aid. Central to this proposal is the suggestion that VINAS represents the narrative behind classification decisions. Coupled with confidence percentages for different classifications, this grid could highlight areas of ambiguity, abnormality or distinction to an operator quickly, allowing for speedy visual assessment of the autonomous agent's decision-making.

Figure 5:
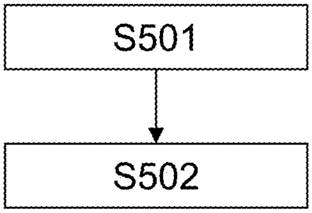
FIG. 5 schematically depicts a method according to an exemplary embodiment.

FIG. 5 schematically depicts a method according to an exemplary embodiment.

The method is of training a machine learning, ML, algorithm, the method implemented, at least in part, by a computer comprising a processor and a memory.

At S501, the method comprises providing training data comprising a set of audio signals, including a first audio signal, as respective bitstreams, corresponding with respective sets of watercraft.

At S502, the method comprises training the ML algorithm using the provided training data comprising detecting the respective sets of watercraft and classifying the detected respective sets of watercraft according to a set of classes, including a first class, based, at least in part, on a set of labels, including a first label, wherein the set of labels relates to propeller, propulsor, prime mover and/or submerged equipment associated with watercraft.

The method may include any step as described with respect to the first aspect.

Figure 6:
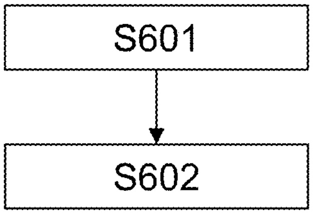
FIG. 6 schematically depicts a method according to an exemplary embodiment.

FIG. 6 schematically depicts a method according to an exemplary embodiment.

The method is of classifying watercraft, the method implemented, at least in part, by a computer comprising a processor and a memory.

At S601, the method comprises obtaining a first audio signal corresponding with a first set of watercraft, including the first watercraft, for example using a hydrophone.

At S602, the method comprises inferring a first class of a set of classes, representing the first watercraft, using a trained ML algorithm and the obtained first audio signal, for example wherein the ML algorithm is trained according to the first aspect.

The method may include any step as described with respect to the first aspect and/or the second aspect.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of classifying watercraft, the method implemented by a computer comprising a processor and a memory, the method comprising:

providing training data comprising a set of training audio signals, including a training audio signal, as respective bitstreams, corresponding with respective sets of watercraft;

training a machine learning (ML) algorithm using the provided training data, the training comprising detecting the respective sets of watercraft and classifying the detected respective sets of watercraft according to a set of classes based on the training audio signal, including a first class, based on a set of labels, including a first label, wherein the set of labels relates to a propeller, a propulsor, a prime mover, and/or a submerged equipment associated with the respective sets of watercraft, thereby providing a trained ML algorithm configured to fit the training audio signal to the first label;

providing the computer aboard a communicatively isolated sub-surface watercraft;

obtaining a first input audio signal corresponding with a first set of watercraft, including a first watercraft;

inferring the first class of the set of classes, representing the first watercraft, using the trained ML algorithm and the first input audio signal;

displaying, on a display communicatively coupled to the computer, respective representations of the first set of watercraft, including the first watercraft, via a graphical user interface; and displaying, on the display, the set of labels, including the first label, of the first class representing the first watercraft as a grid, each label in the set of labels being colored depending on how many of the labels associated with the first set of watercraft were fit by the trained ML algorithm to the first input audio signal.

2. The method according to claim 1, comprising reclassifying the first class, representing the first watercraft, responsive to re-selection of the set of labels by the human user.

3. The method according to claim 1, comprising reclassifying the first class, representing the first watercraft, responsive to receiving information related to the first watercraft.

4. The method according to claim 3, comprising training the ML algorithm using the training audio signal, based on reclassifying the first class, representing the first watercraft.

5. The method according to claim 1, comprising:

obtaining a second input audio signal corresponding with the first set of watercraft, including the first watercraft; and inferring the first class of the set of classes, representing the first watercraft, using the trained ML algorithm, the obtained second input audio signal, and the obtained first input audio signal.

6. The method according to claim 1, comprising determining a location, a bearing, a velocity, an acceleration, a manoeuvre, and/or an activity of the first watercraft, using the trained ML algorithm and the obtained first input audio signal.

7. The method according to claim 1, wherein the first-training audio signal comprises frequencies in a range from 10 Hz to 30 KHz.

8. The method according to claim 1, wherein the first training audio signal corresponds with a set of rotating propellers, including a first rotating propeller, defined based on propeller information including at least one of a number of propellers, a type of propeller, a number of blades, a propeller characteristic, a blade characteristic, a rotational speed, or a shaft characteristic; and/or wherein the training audio signal corresponds with a set of propulsors, including a first propulsor, defined based on propulsor information including at least one of a type of propulsor or a propulsor characteristic.

9. The method according to claim 1, wherein the first-training audio signal corresponds with a set of prime movers, including a first prime mover, defined based on prime mover information including at least one of a type of prime mover or a prime mover characteristic.

10. The method according to claim 1, wherein the first-training audio signal corresponds with submerged equipment associated with the respective sets of watercraft.

11. The method according to claim 1, wherein providing the training data comprises obtaining the training audio signal, using a hydrophone.

12. The method according to claim 1, wherein providing the training data comprises generating the training audio signal, by combining two or more obtained audio signals.

13. The method according to claim 1, wherein providing the training data comprises creating a set of spectrograms, including a first spectrogram, from the set of training audio signals, wherein the first spectrogram corresponds with the training audio signal.

14. A non-transient computer-readable storage medium encoded with instructions that when executed by one or more processors cause a process to be carried out for classifying watercraft, the process comprising:

training a machine learning (ML) algorithm using training data, the training data including a set of training audio signals as respective bitstreams, corresponding with respective sets of watercraft, the training comprising detecting the respective sets of watercraft and classifying the detected respective sets of watercraft according to a set of classes, including a first class, based on the training audio signals and a set of labels, including a first label, wherein the set of labels relates to a propeller, a propulsor, a prime mover, and/or a submerged equipment associated with the respective sets of watercraft, thereby providing a trained ML algorithm configured to fit the training audio signal to the first label;

obtaining a first input audio signal corresponding with a first set of watercraft, including a first watercraft;

inferring the first class of the set of classes, representing the first watercraft, using the trained ML algorithm and the first audio signal;

displaying, on a display, respective representations of the first set of watercraft, including the first watercraft, via a graphical user interface; and displaying, on the display, the set of labels, including the first label, of the first class representing the first watercraft as a grid, each label in the set of labels being colored depending on how many of the labels associated with the first set of watercraft were fit by the trained ML algorithm to the first audio signal.

15. The method according to claim 3, comprising training the ML algorithm using the first training audio signal, based on reclassifying the first class, representing the first watercraft.

16. The method according to claim 15, comprising:

obtaining a second input audio signal corresponding with the first set of watercraft, including the first watercraft; and inferring the first class of the set of classes, representing the first watercraft, using the trained ML algorithm, the obtained second input audio signal, and the obtained first input audio signal.

17. The method according to claim 16, comprising determining a location, a bearing, a velocity, an acceleration, a manoeuvre, and/or an activity of the first watercraft, using the trained ML algorithm and the obtained first input audio signal, wherein the first-training audio signal comprises frequencies in a range from 10 Hz to 30 kHz.

18. The method according to claim 17, wherein the first training audio signal corresponds with:

a set of rotating propellers, including a first rotating propeller, defined based on propeller information including at least one of a number of propellers, a type of propeller, a number of blades, a propeller characteristic, a blade characteristic, a rotational speed, or a shaft characteristic;

a set of propulsors, including a first propulsor, defined based on propulsor information including at least one of a type of propulsor or a propulsor characteristic;

a set of prime movers, including a first prime mover, defined based on prime mover information including at least one of a type of prime mover or a prime mover characteristic; and/or submerged equipment associated with the respective sets of watercraft.

19. A non-transient computer-readable storage medium encoded with instructions that when executed by one or more processors cause a process to be carried out for classifying watercraft, the process comprising:

obtaining a first input audio signal corresponding with a first set of watercraft, including a first watercraft;

obtaining a second input audio signal corresponding with the first set of watercraft, including the first watercraft; and inferring a first class of a set of classes, representing the first watercraft, using a trained machine learning (ML) algorithm, the first input audio signal, and the second input audio signal, the trained ML algorithm trained using training data, the training data including a set of training audio signals as respective bitstreams, corresponding with respective sets of watercraft, the training comprising detecting the respective sets of watercraft and classifying the detected respective sets of watercraft according to the set of classes, including the first class, based on the training audio signals and a set of labels, including a first label, wherein the set of labels relates to a propeller, a propulsor, a prime mover, and/or a submerged equipment associated with the respective sets of watercraft, thereby providing a trained ML algorithm configured to fit the training audio signal to the first label;

displaying, on a display, respective representations of the first set of watercraft, including the first watercraft, via a graphical user interface; and displaying, on the display, the set of labels, including the first label, of the first class representing the first watercraft as a grid, each label in the set of labels being colored depending on how many of the labels associated with the first set of watercraft were fit by the trained ML algorithm to the first audio signal.

20. The method according to claim 1, wherein the first audio signal is associated with a construct/contrast pair, and wherein a first label in the set of labels is colored a first color when the first label is fit to the first audio signal and a second color when the first label is not fit to the first audio signal, the first color being different from the second color.

* * * * *